S. W. COX.
Device for Drawing and Measuring Liquids.

No. 232,630. Patented Sept. 28, 1880.

Witnesses,
E. F. Benham,
D. B. Carver.

Inventor:
SILAS W. COX,
—by—
William H. Low,
Attorney.

UNITED STATES PATENT OFFICE.

SILAS W. COX, OF NEW YORK, N. Y.

DEVICE FOR DRAWING AND MEASURING LIQUIDS.

SPECIFICATION forming part of Letters Patent No. 232,630, dated September 28, 1880.

Application filed July 28, 1879.

*To all whom it may concern:*

Be it known that I, SILAS W. COX, of the city, county, and State of New York, have invented a new and useful Device for Drawing and Measuring Liquids, of which the following is a full and exact description.

My invention consists of a close vessel provided with a graduated index, in combination with a pump adapted to supply said vessel and form a hermetic connection between the reservoir in which the liquid is contained and the said measuring-vessel.

It also consists in combining with said measuring-vessel a double-acting float-valve adapted to open by the pressure of the air escaping from said vessel, and to automatically close to prevent the escape of the liquid when an excessive quantity is pumped into said vessel, and in combining with said measuring-vessel a disk arranged to float upon the surface of the liquid contained in said vessel, so as to distinctly mark the level of the liquid, and when the vessel is filled to its maximum to bear against the under side of the float-valve above referred to, and by exposing a large floating surface to the action of the liquid insure the prompt operation of said valve; and it further consists in the combination, with said measuring-vessel and pump, of a waste-pipe provided with a suitable stop-cock arranged to return to the source of supply any liquid that may be contained in the measuring-vessel.

Figure 1:
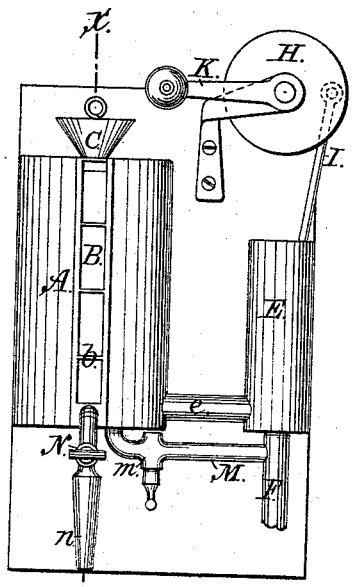
Figure 2:
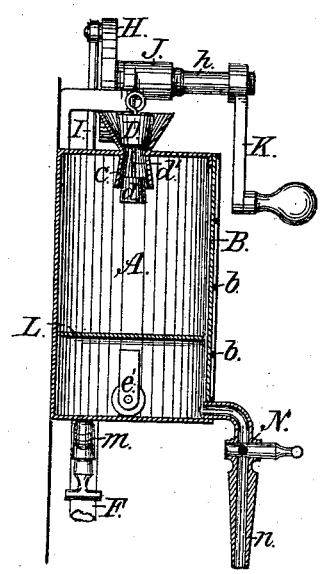
Figure 3:
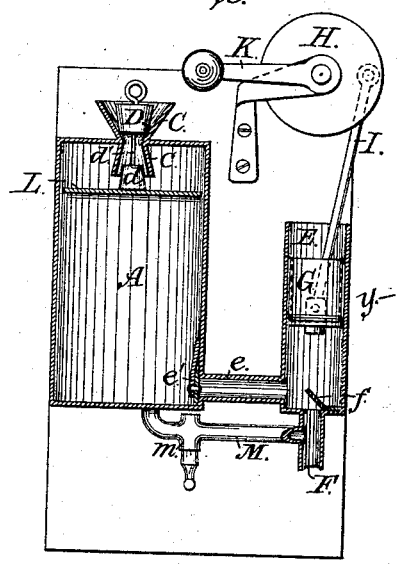
Figure 4:
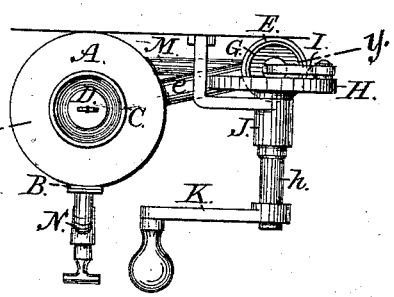

In the accompanying drawings, which form a part of this specification, and to which reference is herein made, Figure 1 is a front elevation of my device; Fig. 2, a vertical section at the line $x\,x$; Fig. 3, a vertical section at the line $y\,y$, and Fig. 4 a plan view.

As illustrated in the drawings, A is the measuring-vessel, which consists of a close chamber provided with a transparent pane, B, at one side of it, fitted with the cross-bars $b$ or other graduations to indicate any required capacity or quantity. In the top plate of said vessel an opening is made to receive the exterior collar, C, and the interior collar, $c$. Said collars are made of a conical form, and are secured at their smaller ends so as to serve as seats for the floating valve, which consists of an upper valve, D, and lower valve, $d$, made of cork or other suitable buoyant material, connected by a stem, $d'$, and arranged in relation to each other and to the collars C $c$ so that they will operate reciprocally—that is to say, when one opens the other closes. While the vessel A is being filled the air displaced by the entering liquid forces the valve D from its seat C and finds an outlet for its escape. If too much liquid is forced into the vessel A, the lower valve, $d$, is raised into close contact with its seat C and prevents the escape of the liquid.

E is a supply-pump, whose eduction-pipe $e$ is connected to the vessel A, and is provided with the eduction-valve $e'$ for closing the outer end of said pipe. The induction-pipe F of said pump is provided with the induction-valve $f$, and forms a connection between the pump and the reservoir for containing the liquid. Said reservoir may be located in any convenient and safe place, either outside or inside of the building in which the device is used. The piston G of the pump is connected by the pitman I to the crank H, and receives a reciprocating motion therefrom. Said crank is secured to the shaft $h$, which revolves in the bearing J. A hand-crank, K, is also secured to the shaft $h$ for the purpose of giving a rotatory motion thereto.

L is a float consisting of a disk of any buoyant material placed within the vessel A, and adapted to float on the surface of the liquid contained therein, for the purpose of more clearly determining the height of the liquid, and for the further purpose of affording an increased lifting-surface for operating the valve $d$, so as to prevent the escape of the liquid through said valve when an excessive quantity is forced into the vessel A.

M is a waste-pipe, forming a communication from the bottom of the vessel A to the induction-pipe F beneath the valve $f$, for the purpose of drawing off from said vessel and into the reservoir any liquid accidentally or purposely deposited in the vessel. Said waste-pipe is provided with a stop-cock, $m$, for governing the discharge from said pipe.

N is a discharge-cock fixed in the bottom of the vessel A and provided with a conical pipe, $n$, for inserting in the mouth of the can or other receptacle into which the liquid is discharged from the said vessel.

It will be seen that by this device any liquid may be measured and transferred from one receptacle to another without exposing the liquid to the atmosphere; that by it kerosene, alcohol, or other inflammable or dangerous liquids may be drawn and measured with perfect safety; and that by its use the reservoirs for containing such dangerous liquids may be located in a safe place outside of the building in which the liquid is drawn, thereby securing great safety in the transfer of such liquids.

It is obvious that any other kind of pumping device may be substituted for the pump herein shown and described. Therefore I do not confine myself to a pump of that precise construction.

I claim as my invention—

1. The combination, with a graduated measuring-vessel, A, having a graduated transparent pane, B, provided with the float L and valve $d$, of a supply-pump, E, hermetically connected to said measuring-vessel, as and for the purpose herein specified.

2. The combination, with a closed measuring-vessel, A, having a supply-pump, E, hermetically connected thereto, as herein described, of the waste-pipe M, hermetically connected to the measuring-vessel A and induction-pipe F, and provided with a stop-cock, $m$, arranged in relation to said vessel and pump as herein described, whereby all or any portion of the liquid contained in the said measuring-vessel may be returned to the supply-reservoir without being exposed to the atmosphere, as and for the purpose herein specified.

3. The combination, with a closed measuring-vessel, A, provided with a double-acting valve, D $d$, float L, and discharge-cock N, of the supply-pump E and waste-pipe M, hermetically connected to the measuring-vessel A and induction-pipe F, and provided with the stop-cock $m$, all arranged to operate essentially as herein specified.

SILAS W. COX.

Witnesses:
JAS. A. O'NEIL,
EDW. H. BEARSE,
JAMES H. GREDEY.